Patented June 5, 1951

2,555,500

UNITED STATES PATENT OFFICE 2,555,500

COPOLYMERS OF 4-VINYLCYCLOHEXENE DIOXIDE

Fred Ronald Morehouse and Walter John Hornibrook, McMasterville, Quebec, Canada, assignors to Canadian Industries Limited, Montreal, Quebec, Canada, a corporation of Canada No Drawing. Application December 6, 1949, Serial No. 131,496. In Canada November 4, 1949

12 Claims. (Cl. 260—2)

1

This invention relates to new polymeric materials. More particularly, it relates to new copolymers of 4-vinylcyclohexene dioxide and to their preparation.

4-vinylcyclohexene dioxide, a recently synthesize compound, is prepared by reacting 4-vinylcyclohexene with hypochlorous acid and by dehydrochlorinating the resultant 4-vinylcyclohexene dichlorohydrins. In United States Patent No. 2,460,195, there have been disclosed homopolymers of 4-vinylcyclohexene dioxide together with a process for preparing these copolymers which comprises heating 4-vinylcyclohexene dioxide in the presence of perchloric acid as a polymerization catalyst.

The homopolymers of 4-vinylcyclohexene dioxide are adapted for a wide variety of uses. However, for certain purposes, the unmodified polymers are not entirely suited despite their possession of some highly advantageous properties. This is particularly true in the use of these polymers as coatings and films where there is considerable room for improvement in the flexibility of the polymers.

It has now been found that polymers having improved properties and, more particularly, films having improved flexibility are obtained when 4-vinylcyclohexene dioxide is copolymerized with monoepoxides such as propylene oxide.

It has also been found that under the conditions hereinafter specified, two different types of polymers are obtained by copolymerization of 4-vinylcyclohexene dioxide with monoepoxides. By effecting reaction of the 4-vinylcyclohexene dioxide with the monoepoxides in the presence of a catalytic amount of boron trifluoride and a small amount of butanol, there are obtained linear thermoplastic copolymers having residual epoxide rings. Upon heat treatment in the presence of an acidic material, the linear thermoplastic copolymers are transformed into three-dimensional polymers by cross-linking through the residual epoxide rings.

The above formation of linear thermoplastic copolymers having residual epoxide rings is an entirely unexpected result. According to United States Patent Nos. 2,380,185 and 2,425,755, no free epoxide ring should be left in the polymers but the butanol should react with the free epoxide rings under the influence of boron trifluoride to yield hydroxy ethers or cross-linked polymers in the first place.

It is therefore an object of this invention to provide new copolymers of 4-vinylcyclohexene dioxide and processes of preparing same. An-

2 other object is to provide new linear thermoplastic copolymers and new cross-linked copolymers of 4-vinylcyclohexene dioxide and processes of preparing same. A further object is to provide new copolymers of 4-vinylcyclohexene dioxide having greater flexibility than homopolymers of 4-vinylcyclohexene dioxide. A further and more specific object is to provide copolymers of 4-vinylcyclohexene dioxide particularly adapted for use in films and castings. Other objects will be apparent from the description of the invention given hereinafter.

The above objects are accomplished according to the present invention by copolymerizing 4-vinylcyclohexene dioxide with from 5% to 95% by weight of monoepoxides such as propylene oxide. More particularly, the invention comprises slowly adding to a mixture of 4-vinylcyclohexene dioxide and monoepoxide a dilute solution of boron trifluoride in a 98/2 weight mixture of inert solvent and butanol at a temperature of from 0° C. to 40° C. The invention also comprises heating the resultant linear thermoplastic copolymer in contact with an acidic material at a temperature above 60° C. whereby a cross-linked copolymer is obtained.

The following examples, in which all proportions are given by weight unless otherwise specified, illustrate specific embodiments of the invention.

Example I 17 parts of 4-vinylcyclohexene dioxide, 37 parts of propylene oxide and 46 parts of toluene were placed in a three-necked flask equipped with a sealed stirrer, a reflux condenser, a thermometer and a dropping funnel, and 0.11 part of boron trifluoride was added dropwise at 20° C. as a 0.28% solution in a 98/2 weight mixture of toluene and butanol. The catalyst was then destroyed with ammonia and the toluene and excess propylene oxide removed by distillation. A linear thermoplastic copolymer was thus obtained containing 24% 4-vinylcyclohexene dioxide units, 76% propylene oxide units and the theoretical maximum of residual epoxide rings i. e. 50% of the total oxide value of the 4-vinylcyclohexene dioxide present in the copolymer.

Example II

A linear thermoplastic copolymer containing 40% 4-vinylcyclohexene dioxide units, 60% propylene oxide units and the theoretical maximum of residual epoxide rings was obtained by applying the procedure of Example I to 18 parts of 4-vinylcyclohexene dioxide, 35 parts of propylene oxide and 47 parts of toluene using 0.13 part of boron trifluoride.

Example III

By applying the procedure of Example I to 25 parts of 4-vinylcyclohexene dioxide, 34 parts of propylene oxide and 41 parts of toluene using 0.13 part of boron trifluoride, there was obtained a linear thermoplastic copolymer containing 46% 4-vinylcyclohexene dioxide units, 54% propylene oxide units and 45% of the total oxide value of the 4-vinylcyclohexene dioxide present therein.

Example IV

In a three-necked flask equipped with a sealed stirrer, a reflux condenser, a thermometer and a dropping funnel, there were placed 36 parts of 4-vinylcyclohexene dioxide, 27 parts of propylene oxide and 37 parts of toluene, and 0.15 part of boron trifluoride was added dropwise at 20° C. as a 0.28% solution in a 98/2 weight mixture of toluene and butanol. After destruction of the catalyst and distillation of toluene and excess propylene oxide, a linear thermoplastic copolymer was obtained containing 67% 4-vinylcyclohexene dioxide units, 33% propylene oxide units and 45% of the total oxide value of the 4-vinylcyclohexene dioxide present therein.

To 100 parts of the above copolymer, 0.5 part of perchloric acid was added as a 1.5% solution in dioxane and a film was cast therefrom which, after heating at 110° C. for 30 minutes, was hard and insoluble in acetone.

Example V

The procedure of Example IV was repeated using 55 parts of 4-vinylcyclohexene dioxide, 14 parts of propylene oxide and 31 parts of toluene. The linear thermoplastic copolymer obtained had 86% 4-vinylcyclohexene dioxide units and 14% propylene oxide units. A film which was made from the copolymer as in Example IV had properties comparable to those of the film made in Example IV.

Example VI

In a three-necked flask equipped with a sealed stirrer, a reflux condenser, a thermometer and a dropping funnel, there were placed 70 parts of 4-vinylcyclohexene dioxide and 80 parts of ethylene oxide. Temperature was maintained at 0° C. while 0.43 part of boron trifluoride was added dropwise as a 0.43% solution in a 98/2 weight mixture of toluene and butanol. After destruction of the catalyst with ammonia and removal of toluene and unreacted ethylene oxide, a linear thermoplastic copolymer was obtained which contained 77% 4-vinylcyclohexene dioxide units, 23% ethylene oxide units and 23% of the total oxide value of the 4-vinylcyclohexene dioxide present therein.

To 100 parts of the above copolymer, 0.5 part of perchloric acid was added as a 10% solution in propionic acid and a film was cast therefrom which, after heating at 110° C. for 30 minutes, was hard and insoluble in acetone.

Example VII

In a three-necked flask equipped with a sealed stirrer, a thermometer and a dropping funnel, there were placed 45 parts of 4-vinylcyclohexene dioxide and 35 parts of styrene oxide and 0.51 part of boron trifluoride was added dropwise at 10° C. as a 0.43% solution in a 98/2 weight mixture of toluene and butanol. After destruction of the catalyst with ammonia and removal of unreacted styrene oxide, a linear thermoplastic copolymer was obtained containing 70% 4-vinylcyclohexene dioxide units and 30% styrene oxide units.

To 100 parts of the above copolymer, there was added 0.3 part of perchloric acid as a 1.5% solution in dioxane and a film was cast therefrom. After heating at 100° C. for 15 minutes, this film had excellent gloss, hardness and acetone resistance.

It will be understood that the above examples are merely illustrative and that the invention broadly comprises copolymerizing 4-vinylcyclohexene dioxide with a monoepoxide. Preferred monoepoxides, in addition to propylene oxide, include ethylene oxide, styrene oxide, butene-1 oxide, butene-2 oxide, isobutylene oxide, trimethylene oxide, cyclopentylene oxide, etc. as well as substituted alkylene monoepoxides which contain various substituent groups in addition to the epoxide group like the epihalohydrins such as epichlorohydrin, epibromohydrin, alpha-methyl epichlorohydrin, beta-methyl epichlorohydrin, alpha,alpha'-dimethyl epibromohydrin, etc., nitro epoxide compounds such as nitro styrene oxide, etc. epoxide ethers such as methyl glycidyl ether, cyclopentyl glycidyl ether, phenyl glycidyl ether, etc., epoxide thioethers such as ethyl glycidyl thioether, tolyl glycidyl thioether, etc., epoxide esters such as glycidyl acetate, glycidyl propionate, glycidyl benzoate, etc. and the like. Excluded from the meaning of the term "monoepoxides" as used herein are monoepoxide compounds which contain active hydrogen-containing groups such as amino groups, carboxyl groups, hydroxyl groups, etc., which are also reactive with the epoxide rings of 4-vinylcyclohexene dioxide.

The linear thermoplastic copolymerization is preferably carried out in the presence of an inert solvent, but it may also be carried out in bulk as illustrated by Examples VI and VII. Any inert organic solvent can be used such as benzene, toluene, xylene, isooctane, cyclohexane, methyl acetate, butyl acetate, chloroform, carbon tetrachloride, acetone, methyl isobutyl ketone, etc. Mixtures of inert organic solvents can also be used, e. g. 50/50 mixtures by weight of xylene and methyl isobutyl ketone. Amongst the inert solvents that can be used, aromatic hydrocarbon solvents such as toluene are preferred. Aromatic hydrocarbon inert solvents are also preferred for the boron trifluoride solution.

A dilute solution of boron trifluoride in a 98/2 weight mixture of inert solvent and butanol is necessary in order to control the rate and the extent of the linear thermoplastic copolymerization. A boron trifluoride concentration of from 0.20% to 0.75% by weight is suitable but it is preferred to use a concentration in the range of 0.25% to 0.35%. Satisfactory linear copolymers are obtained when from 0.20% to 0.30% (by weight of the monomers) of boron trifluoride is added in such dilute solution at a temperature of from 0° C. to 40° C., preferably 20° C.

Butanol is used in the linear copolymerization as a solvent for boron trifluoride and as a chain transfer agent inducing polymerization through its active hydrogen. It has been found that for boron trifluoride concentrations of 0.20 to 0.75%, at least 2% of butanol, based on the weight of the solvent mixture, is required to prevent formation of gel particles. Since alcohols such as butanol react very readily with epoxides in the presence of boron trifluoride, use of more than 2% butanol would interfere with the polymerization and hence is not considered practical. Other chain transfer agents which are also solvents for boron trifluoride, e. g. acetic anhydride, can be used as well as butanol.

Although perchloric acid is the only acidic material used in the foregoing examples for cross-linking the linear thermoplastic copolymers, other organic or inorganic acid or acid-yielding materials can be used. Examples of such materials are zinc chloride, aluminum chloride, ferric chloride, stannic chloride, butane sulphonic acid, benzene sulphonic acid, etc. Usually conversion of the copolymers is obtained by employing from 0.001 to 5%, preferably from 0.2 to 0.5% of the acid or acid-yielding material, based on the weight of the copolymers. As a rule, conversion occurs at temperatures in the range of 60° to 180° C. in about 15 to 30 minutes. If desired, longer curing times can be employed at lower temperatures.

The copolymers of this invention are adapted for a wide variety of uses. The formation of a thermoplastic product at an intermediate stage of the production of cross-linked copolymers is particularly important in the protective coating field where it is highly desirable to prepare a linear thermoplastic polymer, apply it to the articles to be coated and then cross-link it by baking. For this reason and because of their relative flexibility and lack of brittleness, coatings and films of these copolymers are particularly valuable. However, as cast polymers, these copolymers are useful for a great number of other purposes.

As many apparently widely different embodiments of this invention may be made without departing from the spirit and scope thereof, it is to be understood that the invention is not limited to the specific embodiments thereof except as defined in the appended claims.

Having thus described our invention what we claim is:

1. Linear copolymers of 4-vinylcyclohexene dioxide and a monoepoxide free of active hydrogen-containing groups, said copolymers being capable of cross-linking upon heat treatment in the presence of an acidic material.

2. Linear copolymers of 4-vinylcyclohexene dioxide and ethylene oxide, said copolymers being capable of cross-linking upon heat treatment in the presence of an acidic material.

3. Linear copolymers of 4-vinylcyclohexene dioxide and propylene oxide, said copolymers being capable of cross-linking upon heat treatment in the presence of an acidic material.

4. Linear copolymers of 4-vinylcyclohexene dioxide and styrene oxide, said copolymers being capable of cross-linking upon heat treatment in the presence of an acidic material.

5. A process for preparing linear copolymers which comprises slowly adding to a mixture of 4-vinylcyclohexene dioxide and a monoepoxide free of active hydrogen-containing groups a dilute solution of boron trifluoride in a 98/2 weight mixture of inert solvent and butanol at a temperature of from 0° to 40° C.

6. A process for preparing linear copolymers which comprises slowly adding to a mixture of 4-vinylcyclohexene dioxide and a monoepoxide free of active hydrogen-containing groups in an inert solvent a dilute solution of boron trifluoride in a 98/2 weight mixture of inert solvent and butanol at a temperature of from 0° to 40° C.

7. A process for preparing linear copolymers which comprises slowly adding to a mixture of 4-vinylcyclohexene dioxide and a monoepoxide free of active hydrogen-containing groups in toluene, a dilute solution of boron trifluoride in a 98/2 weight mixture of toluene and butanol at a temperature of from 0° to 40° C.

8. A process for preparing linear copolymers which comprises slowly adding to a mixture of 4-vinylcyclohexene dioxide and a monoepoxide free of active hydrogen-containing groups in toluene a 0.25–0.35% solution of boron trifluoride in a 98/2 weight mixture of toluene and butanol at a temperature of about 20° C.

9. The cross-linked copolymers obtained by heating the linear copolymers of claim 1 at temperatures above 60° C. in the presence of an acidic material.

10. The cross-linked copolymers obtained by heating the linear copolymers of claim 2 at temperatures above 60° C. in the presence of an acidic material.

11. The cross-linked copolymers obtained by heating the linear copolymers of claim 3 at temperatures above 60° C. in the presence of an acidic material.

12. The cross-linked copolymers obtained by heating the linear copolymers of claim 4 at temperatures above 60° C. in the presence of an acidic material.

FRED RONALD MOREHOUSE.
WALTER JOHN HORNIBROOK.

REFERENCES CITED

The following references are of record in the file of this patent:

UNITED STATES PATENTS

| Number | Name | Date |
| --- | --- | --- |
| 2,460,195 | Segall | Jan. 25, 1949 |
| 2,476,922 | Shokal et al. | July 19, 1949 |

OTHER REFERENCES

Ellis: Chemistry of Synthetic Resins, vol. I (1935), page 60.